United States Patent
Ferris et al.

(10) Patent No.: US 8,145,934 B1
(45) Date of Patent: Mar. 27, 2012

(54) SOFT START SEQUENCER FOR STARTING MULTIPLE VOLTAGE REGULATORS

(75) Inventors: Timothy A. Ferris, Mission Viejo, CA (US); John R. Agness, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 397 days.

(21) Appl. No.: 12/534,052

(22) Filed: Jul. 31, 2009

(51) Int. Cl.
*G06F 1/26* (2006.01)
*G06F 1/14* (2006.01)

(52) U.S. Cl. .................. 713/330; 713/300; 713/502

(58) Field of Classification Search .................. None
See application file for complete search history.

(56) References Cited

U.S. PATENT DOCUMENTS

| | | | |
|---|---|---|---|
| 6,316,924 B1 | 11/2001 | Stapleton et al. | |
| 6,320,439 B1 | 11/2001 | Garbelli et al. | |
| 6,429,706 B1 | 8/2002 | Amin et al. | |
| 6,693,410 B1 | 2/2004 | Terrien | |
| 6,879,139 B2 | 4/2005 | Brown et al. | |
| 6,936,999 B2 | 8/2005 | Chapuis | |
| 7,105,947 B1 | 9/2006 | Marshall et al. | |
| 7,180,757 B2 | 2/2007 | Chen et al. | |
| 7,200,051 B2 | 4/2007 | Takeuchi | |
| 7,266,709 B2 | 9/2007 | Chapuis et al. | |
| 7,315,156 B2 | 1/2008 | Chapuis | |
| 7,378,827 B2 | 5/2008 | Stoichita | |
| 7,394,445 B2 | 7/2008 | Chapuis et al. | |
| 7,456,617 B2 | 11/2008 | Chapuis et al. | |
| 7,459,892 B2 | 12/2008 | Chapuis | |
| 2005/0188235 A1* | 8/2005 | Atkinson | 713/330 |
| 2007/0080726 A1 | 4/2007 | Khan et al. | |
| 2008/0155290 A1 | 6/2008 | Kanzawa | |
| 2008/0238655 A1* | 10/2008 | McShane et al. | 340/538 |
| 2008/0307240 A1* | 12/2008 | Dahan et al. | 713/320 |

OTHER PUBLICATIONS

Intersil Data Sheet, ISL6123, ISL6124, ISL6125, ISL6126, ISL6127, ISL6128, ISL6130, Oct. 15, 2008, FN9005.10, 22 pages.
Maxim Dual-/Triple-Voltage, Power-Supply Trackers/Sequencers/Supervisors, MAX6877/MAX6878/MAX6879, 19-3771, Rev. 1, Oct. 2005, 24 pages.
National Semiconductor, LM3880/LM3880Q Power Sequencer, May 1, 2008, 12 pages.
Actel Corporation, Application Note AC285, Fusion Power Sequencing and Ramp-Rate Control, Sep. 2006, 22 pages.

* cited by examiner

*Primary Examiner* — Dennis M Butler

(57) ABSTRACT

A soft start sequencer is disclosed for starting a plurality of voltage regulators, the soft start sequencer comprising a first clock for clocking a plurality of soft start circuits, wherein each soft start circuit for ramping a reference signal from a first value to a second value over a ramp time after a delay time. Each soft start circuit comprises a divider operable to divide the first clock by an integer N to generate a second clock, a first counter clocked by the first clock, the first counter operable to time the delay time, and a second counter clocked by the second clock, the second counter operable to time the ramp time after the delay time.

19 Claims, 3 Drawing Sheets

SOFT START SEQUENCER FOR STARTING MULTIPLE VOLTAGE REGULATORS

BACKGROUND

Integrated circuits such as used in consumer devices (computers, phones, televisions, storage devices, etc.) typically employ multiple voltage regulators for generating various regulated supply voltages. The different regulated supply voltages power different components which may require different power supply levels. For example, input/output circuitry of a device may be powered at first supply voltage, whereas core processing circuitry may be powered at a lower supply voltage.

DETAILED DESCRIPTION OF EMBODIMENTS OF THE INVENTION

Figure 1A:
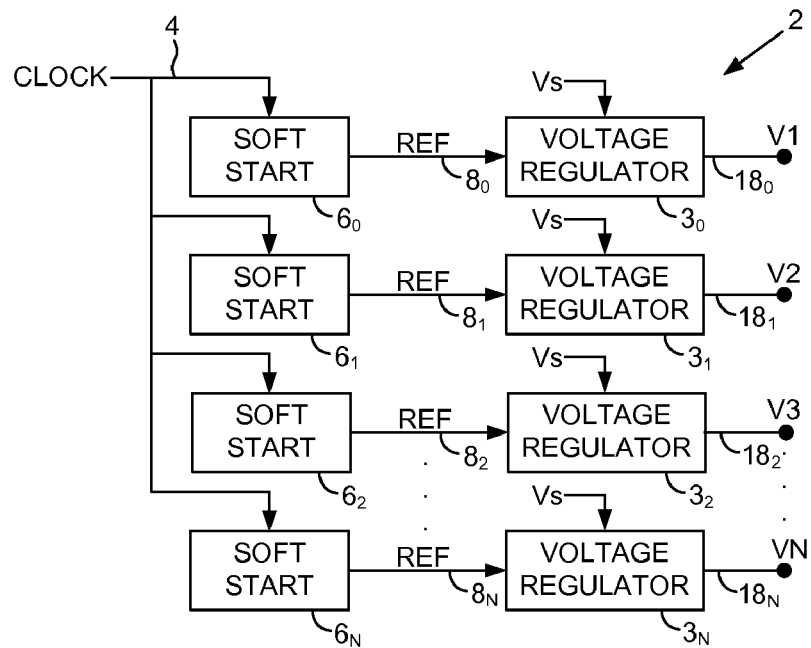
FIG. 1A shows a soft start sequencer according to an embodiment of the present invention comprising a plurality of soft start circuits, wherein each soft start circuit ramps a reference signal from a first value to a second value over a ramp time after a delay time.
Figure 1B:
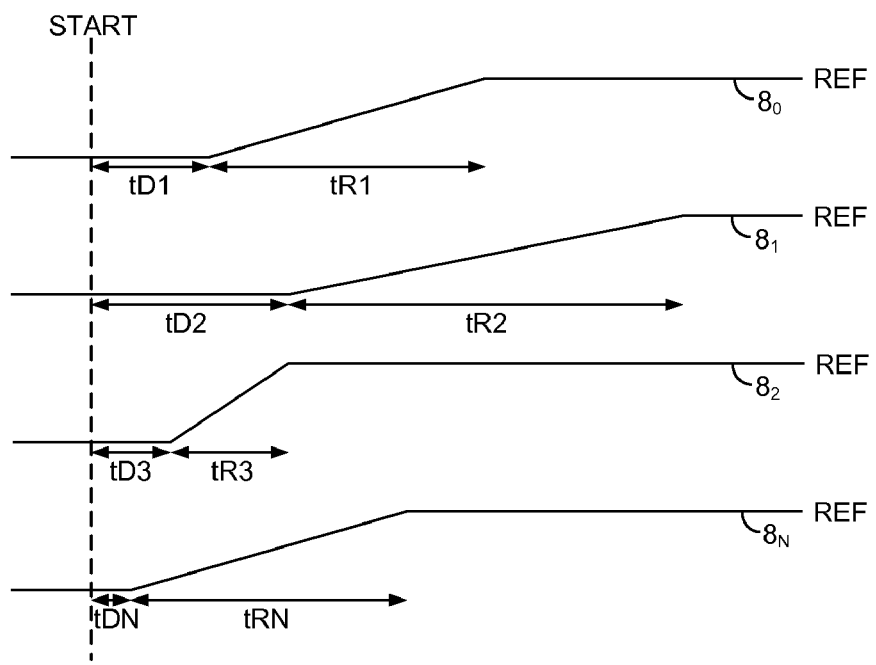
FIG. 1B illustrates an embodiment of the present invention wherein each soft start circuit operates according to a specific ramp time and delay time when generating the reference signal.
Figure 2A:
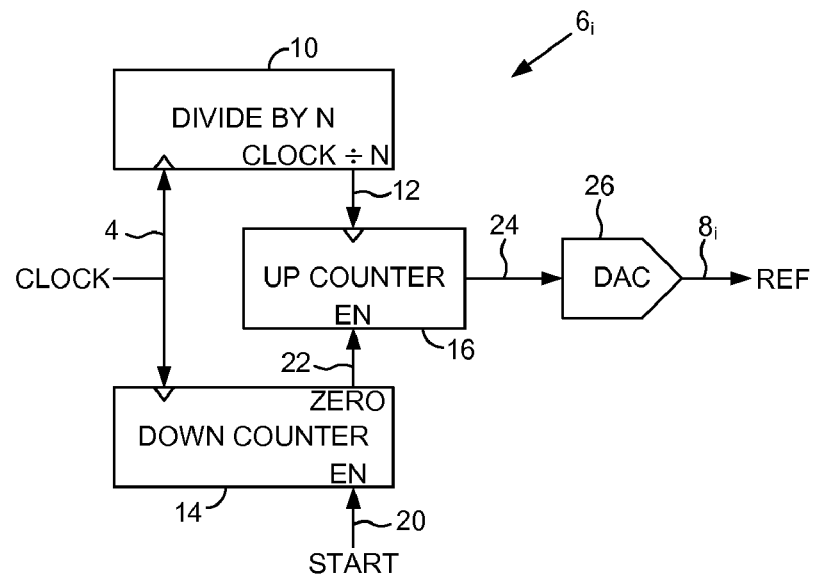
FIG. 2A shows a soft start circuit according to an embodiment of the present invention comprising a divider for dividing a first clock by an integer N to generate a second clock, wherein the first clock clocks a first counter for timing the delay time, and the second clock clocks a second counter for timing the ramp time.

FIG. 1A shows a soft start sequencer $2$ according to an embodiment of the present invention for starting a plurality of voltage regulators $3_0$-$3_N$, the soft start sequencer $2$ comprising a first clock $4$ for clocking a plurality of soft start circuits $6_0$-$6_N$, wherein each soft start circuit $6_i$ for ramping a reference signal $8_0$-$8_N$ from a first value to a second value over a ramp time tRi after a delay time tDi (FIG. 1B). FIG. 2A shows an embodiment of the present invention wherein each soft start circuit $6_i$ comprises a divider $10$ operable to divide the first clock $4$ by an integer N to generate a second clock $12$, a first counter $14$ clocked by the first clock $4$, the first counter $14$ operable to time the delay time, and a second counter $16$ clocked by the second clock $12$, the second counter $16$ operable to time the ramp time after the delay time.

In one embodiment, a first one of the voltage regulators $3_0$ generates a first output voltage level $18_0$ in response to a first reference signal $8_0$ generated by a first one of the soft start circuits $6_0$, and a second one of the voltage regulators $3_1$ generates a second output voltage level $18_1$ in response to a second reference signal $8_1$ generated by a second one of the soft start circuits $6_1$, wherein the first output voltage level $18_0$ is different from the second output voltage level $18_1$. For example, in one embodiment the first voltage regulator $3_0$ may generate a first output voltage level $18_0$ for powering input/output circuitry, whereas the second voltage generator $3_1$ may generate a second output voltage level $18_1$ for powering core processing circuitry. In other embodiments, two or more of the output voltages $18_0$-$18_N$ may be generated with the same voltage level. In addition, any suitable reference signal $8$ may be generated by the soft start circuits, such as a reference voltage or a reference current.

In the embodiment of FIG. 2A, the first counter $14$ for timing the delay time comprises a down counter, and the second counter $16$ for timing the ramp time comprises an up counter. A start signal $20$ starts the first counter $14$ in each of the soft start circuits $6_i$ together (synchronously). When the down counter $14$ reaches zero it activates a control signal $22$ that enables the up counter $16$. The value of the up counter $16$ is output on line $24$ which is then converted by a digital-to-analog converter (DAC) $26$ to generate the reference signal $8_i$. The up counter $16$ stops counting when it reaches a predetermined value (e.g., a terminal count). In one embodiment, the terminal count of each up counter $16$ in each soft start circuit is the same such that the final amplitude of the reference signal $8_i$ is the same for each voltage regulator. In an alternative embodiment, the terminal count for each up counter $16$ may be programmably configured to a specific value such that the final amplitude of the reference signal $8_i$ may be different between two or more of the soft start circuits.

Any suitable configuration of counters and logic circuitry may be employed to implement the aspects of the present invention. For example, the first counter $14$ may comprise an up counter that activates signal $22$ after reaching a programmable target count value. Similarly, the second counter $16$ may comprise a down counter, wherein the DAC $26$ may generate the reference signal $8_i$ in an inverse relationship to the counter value (e.g., by subtracting the counter value from a constant value).

The programmable divider $10$ may also be implemented using any suitable circuitry, such as with a counter loaded with a programmable count value and clocked by the first clock $4$. Each time the counter reaches a terminal count, the counter toggles a flip-flop that generates the second clock $12$ and the counter is reset (loaded with the programmable count value). In one embodiment, multiple counters may be employed such that the first clock $4$ is divided by N1 and then divided again by N2. In yet another embodiment, the divider may comprise a plurality of flip-flops connected in series to divide the first clock $4$ by $N1=2^N$, and a counter for dividing the resulting clock by N2.

Figure 2B:
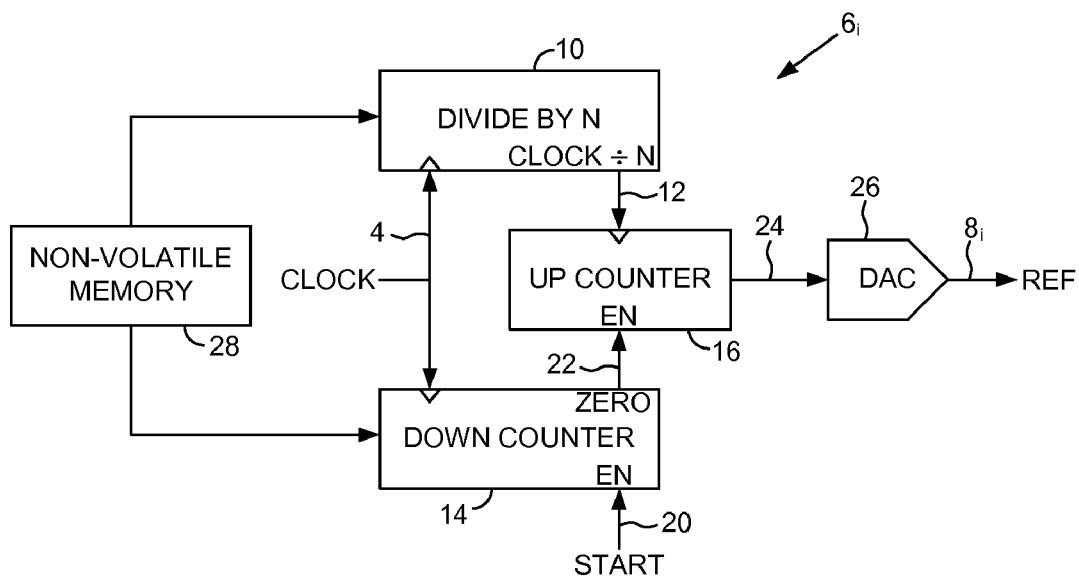
FIG. 2B shows an embodiment of the present invention wherein the integer N and delay time are stored in non-volatile memory for use during the startup process.

FIG. 2B shows an embodiment of the present invention wherein a non-volatile memory $28$ stores the integer N for each of the dividers and for storing an initial value for each of the first counters that time the delay times. In one embodiment, when the soft start sequencer is powered on, the divider values N and the delay values are transferred by state machine circuitry from the non-volatile memory $28$ to volatile memory of the dividers $10$ and the first counters $14$. In another embodiment, the dividers $10$ and first counters $14$ may comprise the non-volatile memory such that the dividers $10$ and first counters $14$ operate directly on the stored values.

In one embodiment, the divider values N and the delay values are stored in the non-volatile memory $28$ during a manufacturing process of the device employing the soft start sequencer. In another embodiment, the non-volatile memory $28$ may be programmed initially with nominal values that enable an internal processor to start reliably. Once started, the internal processor programs the non-volatile memory 28 with specific values that enable all of the voltage regulators to start reliably.

Figure 3:
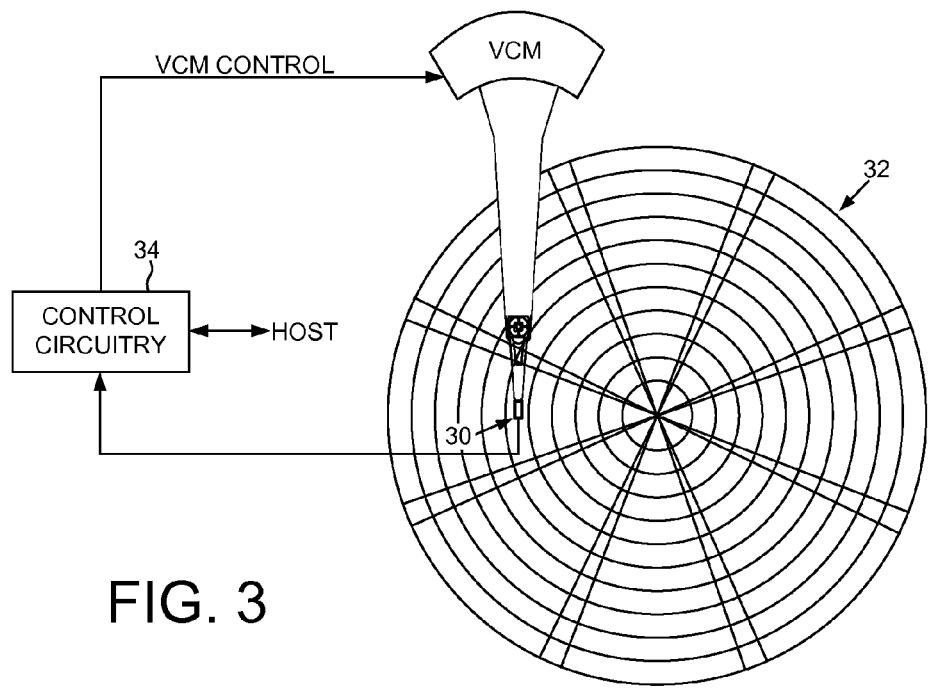
FIG. 3 shows a disk drive according to an embodiment of the present invention comprising a head actuated over a disk, and control circuitry including the soft start sequencer.
Figure 4:
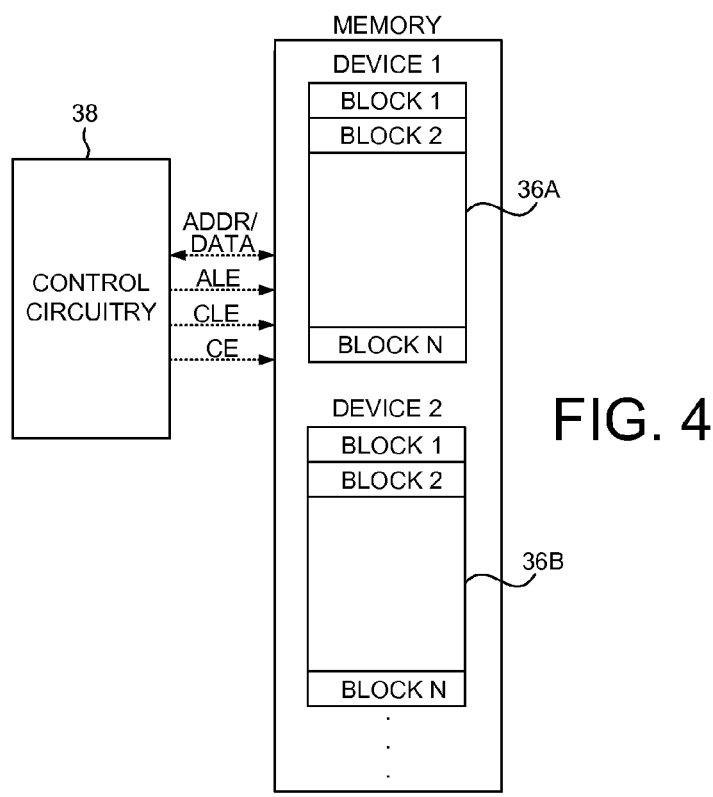
FIG. 4 shows a solid state drive according to an embodiment of the present invention comprising a plurality of non-volatile semiconductor memories and control circuitry including the soft start sequencer.

The soft start sequencer of the present invention may be employed in any suitable device, such as in a data storage device comprising a data storage medium. FIG. 3 shows a disk drive data storage device comprising a head 30 actuated over a disk 32 and control circuitry 34 including a soft start sequencer described above according to an embodiment of the present invention. FIG. 4 shows a solid state drive data storage device comprising a plurality of non-volatile semiconductor memories 36A, 36B, etc., such as flash memories, and control circuitry 38 including a soft start sequencer described above according to an embodiment of the present invention. The soft start sequencer of the present invention may also be employed in any suitable consumer or industrial electronic device other than storage devices. For example, the soft start sequencer may be employed in control circuitry for computers, cell phones, televisions, music players, or any other suitable device.

What is claimed is:

1. A soft start sequencer for starting a plurality of voltage regulators, the soft start sequencer comprising a first clock for clocking a plurality of soft start circuits, wherein each soft start circuit is for ramping a reference signal from a first value to a second value over a ramp time after a delay time, each soft start circuit comprising:
   a divider operable to divide the first clock by an integer N to generate a second clock;
   a first counter clocked by the first clock, the first counter operable to time the delay time; and
   a second counter clocked by the second clock, the second counter operable to time the ramp time after the delay time.

2. The soft start sequencer as recited in claim 1, wherein:
   a first one of the voltage regulators generates a first output voltage level in response to a first reference signal generated by a first one of the soft start circuits; and
   a second one of the voltage regulators generates a second output voltage level in response to a second reference signal generated by a second one of the soft start circuits.

3. The soft start sequencer as recited in claim 2, wherein the first output voltage level is different from the second output voltage level.

4. The soft start sequencer as recited in claim 1, wherein the first counter comprises a down counter and the second counter comprises an up counter.

5. The soft start sequencer as recited in claim 1, wherein the reference signal generated by each soft start circuit comprises one of a reference voltage and reference current.

6. The soft start sequencer as recited in claim 1, wherein each soft start circuit further comprises a digital-to-analog converter for converting an output of the second counter into the reference signal.

7. The soft start sequencer as recited in claim 1, wherein the first counters of the soft start circuits are started together by a start signal.

8. The soft start sequencer as recited in claim 1, further comprising a non-volatile memory for storing the integer N for each of the dividers and for storing a delay value for each of the first counters.

9. A method of starting a plurality of voltage regulators, the method comprising:
   clocking a plurality of soft start circuits with a first clock, each soft start circuit ramping a reference signal from a first value to a second value over a ramp time after a delay time;
   dividing the first clock by an integer N to generate a second clock;
   clocking a first counter with the first clock, the first counter operable to time the delay time; and
   clocking a second counter with the second clock, the second counter operable to time the ramp time after the delay time.

10. The method as recited in claim 9, wherein:
    a first one of the voltage regulators generates a first output voltage level in response to a first reference signal generated by a first one of the soft start circuits; and
    a second one of the voltage regulators generates a second output voltage level in response to a second reference signal generated by a second one of the soft start circuits.

11. The method as recited in claim 10, wherein the first output voltage level is different from the second output voltage level.

12. The method as recited in claim 9, wherein the first counter comprises a down counter and the second counter comprises an up counter.

13. The method as recited in claim 9, wherein the reference signal generated by each soft start circuit comprises one of a reference voltage and reference current.

14. The method as recited in claim 9, wherein each soft start circuit further comprises a digital-to-analog converter for converting an output of the second counter into the reference signal.

15. The method as recited in claim 9, further comprising starting the first counters of the soft start circuits together by a start signal.

16. The method as recited in claim 9, further comprising storing the integer N for each of the dividers and storing a delay value for each of the first counters in a non-volatile memory.

17. A data storage device comprising:
    a storage medium; and
    control circuitry operable to write data to the storage medium and read data from the storage medium, the control circuitry comprising a plurality of voltage regulators and a soft start sequencer for starting the plurality of voltage regulators, the soft start sequencer comprising a first clock for clocking a plurality of soft start circuits, wherein each soft start circuit is for ramping a reference signal from a first value to a second value over a ramp time after a delay time, each soft start circuit comprising:
       a divider operable to divide the first clock by an integer N to generate a second clock;
       a first counter clocked by the first clock, the first counter operable to time the delay time; and
       a second counter clocked by the second clock, the second counter operable to time the ramp time after the delay time.

18. The data storage device as recited in claim 17, wherein the storage medium comprises a disk of a disk drive, the disk drive comprising a head actuated over the disk.

19. The data storage device as recited in claim 17, wherein the storage medium comprises a plurality of non-volatile memories of a solid state drive.

* * * * *